United States Patent
Perez et al.

(10) Patent No.: US 11,117,208 B2
(45) Date of Patent: Sep. 14, 2021

(54) IMPARTING WEAR RESISTANCE TO SUPERALLOY ARTICLES

(71) Applicant: Kennametal Inc., Latrobe, PA (US)

(72) Inventors: Martin G. Perez, Latrobe, PA (US); Michael Meyer, Ligonier, PA (US); Robert W. Monds, Trenton (CA); Loretta M. Bell, Latrobe, PA (US)

(73) Assignee: KENNAMETAL INC., Latrobe, PA (US)

(*) Notice: Subject to any disclaimer, the term of this patent is extended or adjusted under 35 U.S.C. 154(b) by 472 days.

(21) Appl. No.: 15/465,170

(22) Filed: Mar. 21, 2017

(65) Prior Publication Data

US 2018/0272451 A1    Sep. 27, 2018

(51) Int. Cl.
| | |
|---|---|
| *B23K 1/00* | (2006.01) |
| *B22F 1/00* | (2006.01) |
| *B23K 35/02* | (2006.01) |
| *B23K 35/30* | (2006.01) |
| *C22C 19/03* | (2006.01) |
| *C22C 19/07* | (2006.01) |
| *C22C 30/00* | (2006.01) |

(Continued)

(52) U.S. Cl.
CPC .......... *B23K 1/0018* (2013.01); *B22F 1/0059* (2013.01); *B23K 35/0244* (2013.01); *B23K 35/3046* (2013.01); *C22C 19/03* (2013.01); *C22C 19/07* (2013.01); *C22C 30/00* (2013.01); *F01D 5/286* (2013.01); *B22F 2301/15* (2013.01); *B23K 2101/001* (2018.08); *F05D 2300/175* (2013.01); *F05D 2300/177* (2013.01); *F05D 2300/603* (2013.01)

(58) Field of Classification Search
CPC ......... C22C 19/07; C22C 19/00; C22C 19/05; C22C 19/03; C22C 1/0433; C22C 38/22; C22C 38/36; C22C 38/38
See application file for complete search history.

(56) References Cited

U.S. PATENT DOCUMENTS

| | | |
|---|---|---|
| 3,005,795 A | 10/1961 | Busse |
| 3,024,128 A | 3/1962 | Dawson |

(Continued)

FOREIGN PATENT DOCUMENTS

| | | |
|---|---|---|
| CN | 86107619 A | 7/1987 |
| CN | 101491847 A | 7/2009 |

(Continued)

OTHER PUBLICATIONS

Mar. 26, 2019 Foreign OA P16-06182-CA-NP.

(Continued)

*Primary Examiner* — Erin B Saad
(74) *Attorney, Agent, or Firm* — Larry R. Meenan (57) ABSTRACT

In one aspect, composite preforms are provided for imparting wear resistance to superalloy articles. The composite preforms can be employed for metallurgically bonding alloy wear plates or pads to superalloy articles. A composite preform, in some embodiments, comprises a powder alloy composition comprising 1-30 wt. % nickel, 0.05-2 wt. % iron, 15-25 wt. % chromium, 10-30 wt. % molybdenum, 0-1 wt. % carbon, 1-5 wt. % silicon, 0.05-2 wt. % boron, 0-5 wt. % tungsten, 0-3 wt. % tantalum, 0-0.1 wt % manganese, 0-3 wt. % aluminum, 0-0.1 wt % yttrium and the balance cobalt.

6 Claims, 3 Drawing Sheets

(51) Int. Cl.
*F01D 5/28* (2006.01)
*B23K 101/00* (2006.01)

(56) References Cited

U.S. PATENT DOCUMENTS

| | | |
|---|---|---|
| 3,281,511 A | 10/1966 | Goldsmith |
| 3,533,930 A | 10/1970 | Balwit |
| 3,541,070 A | 11/1970 | Ahrabi |
| 3,556,161 A | 1/1971 | Roberts |
| 3,677,853 A | 7/1972 | Stricker |
| 3,743,556 A | 7/1973 | Bailey et al. |
| 3,778,586 A | 12/1973 | Breton |
| 3,838,092 A | 9/1974 | Owen |
| 3,853,690 A | 12/1974 | McGarry |
| 3,864,124 A | 2/1975 | Breton et al. |
| 3,876,447 A | 4/1975 | Lally |
| 3,916,506 A | 11/1975 | Wolf |
| 3,988,405 A | 10/1976 | Smith |
| 4,000,781 A | 1/1977 | Knapp |
| 4,073,639 A | 2/1978 | Duvall et al. |
| 4,102,399 A | 7/1978 | Harnsberger |
| 4,194,040 A | 3/1980 | Breton et al. |
| 4,242,842 A | 1/1981 | Yancey |
| 4,381,944 A | 5/1983 | Smith, Jr. et al. |
| 4,478,871 A | 10/1984 | Sakaguchi |
| 4,493,451 A | 1/1985 | Clark et al. |
| 4,544,377 A | 10/1985 | Schwen |
| 4,596,691 A | 6/1986 | Ruppert et al. |
| 4,596,746 A | 6/1986 | Morishita et al. |
| 4,614,296 A | 9/1986 | Lesgourgues |
| 4,692,305 A | 9/1987 | Rangaswamy et al. |
| 4,830,934 A | 5/1989 | Ferrigno et al. |
| 4,831,944 A | 5/1989 | Durand et al. |
| 4,884,477 A | 12/1989 | Smith |
| 4,910,098 A | 3/1990 | Lee et al. |
| 4,919,013 A | 4/1990 | Smith |
| 4,933,008 A | 6/1990 | Fujiki et al. |
| 4,939,101 A | 7/1990 | Black |
| 4,940,566 A | 7/1990 | Wood et al. |
| 4,966,748 A | 10/1990 | Miyasaka |
| 5,070,591 A | 12/1991 | Quick |
| 5,147,460 A | 9/1992 | Otaki |
| 5,156,321 A | 10/1992 | Liburdi et al. |
| 5,161,728 A | 11/1992 | Li |
| 5,164,247 A | 11/1992 | Solanki et al. |
| 5,236,116 A | 8/1993 | Solanki et al. |
| 5,238,881 A | 8/1993 | Norris |
| 5,240,491 A | 8/1993 | Budinger et al. |
| 5,271,547 A | 12/1993 | Carlson |
| 5,348,215 A | 9/1994 | Rafferty et al. |
| 5,352,526 A | 10/1994 | Solanki et al. |
| 5,441,762 A | 8/1995 | Gray |
| 5,492,550 A | 2/1996 | Krishnan |
| 5,522,134 A | 6/1996 | Rowe et al. |
| 5,523,169 A | 6/1996 | Rafferty et al. |
| 5,523,170 A | 6/1996 | Budinger et al. |
| 5,593,726 A | 1/1997 | Nicholls |
| 5,641,921 A | 6/1997 | Dennis |
| 5,660,320 A | 8/1997 | Hoffmuller |
| 5,743,033 A | 4/1998 | Gegel |
| 5,868,819 A | 2/1999 | Guhde |
| 5,890,274 A | 4/1999 | Clement et al. |
| 5,952,042 A | 9/1999 | Rafferty et al. |
| 6,073,518 A | 6/2000 | Chow |
| 6,103,186 A | 8/2000 | Sievers |
| 6,113,730 A | 9/2000 | Ohya |
| 6,171,709 B1 | 1/2001 | Koizumi |
| 6,649,682 B1 | 11/2003 | Breton et al. |
| 6,749,104 B2 | 6/2004 | Rabinkin |
| 6,749,894 B2 | 6/2004 | Subramanian |
| 7,017,793 B2 | 3/2006 | Kinstler |
| 7,051,435 B1 | 5/2006 | Subramanian et al. |
| 7,115,679 B2 | 10/2006 | Ellison et al. |
| 7,198,209 B2 | 4/2007 | Herbst |
| 7,250,123 B2 | 7/2007 | Fujioka |
| 7,326,892 B1 | 2/2008 | Cretegny et al. |
| 7,335,427 B2 | 2/2008 | Sathian |
| 7,661,491 B2 | 2/2010 | Kembaiyan |
| 7,789,288 B1 | 9/2010 | Johnson et al. |
| 7,968,218 B2 | 6/2011 | Pitonak |
| 8,034,154 B2 | 10/2011 | Singer et al. |
| 8,087,565 B2 | 1/2012 | Kottilingam et al. |
| 8,273,148 B2 | 9/2012 | Minor |
| 8,393,528 B2 | 3/2013 | Richter et al. |
| 8,703,044 B2 | 4/2014 | Sathian et al. |
| 8,808,870 B2 | 8/2014 | Zheng |
| 9,321,107 B2 | 4/2016 | Daniels et al. |
| 9,434,017 B2 | 9/2016 | Salm et al. |
| 2004/0191064 A1 | 9/2004 | Guo |
| 2004/0234820 A1 | 11/2004 | Majagi |
| 2006/0134454 A1 | 6/2006 | Sathian |
| 2006/0134455 A1 | 6/2006 | Belhadjhamida et al. |
| 2006/0134456 A1 | 6/2006 | Ikeda |
| 2007/0141375 A1 | 6/2007 | Budinger et al. |
| 2007/0224349 A1 | 9/2007 | Hosenfeldt |
| 2009/0084895 A1 | 4/2009 | Holwerk |
| 2009/0123268 A1 | 5/2009 | Brittingham et al. |
| 2009/0139607 A1 | 6/2009 | Kool et al. |
| 2009/0255714 A1 | 10/2009 | Sohn |
| 2010/0215983 A1 | 8/2010 | Patel |
| 2010/0261419 A1 | 10/2010 | Sung |
| 2011/0067796 A1 | 3/2011 | Belhadjhamida et al. |
| 2011/0070119 A1 | 3/2011 | Belhadjhamida et al. |
| 2012/0067464 A1* | 3/2012 | Chiba .............. C22C 1/02 148/442 |
| 2012/0077058 A1 | 3/2012 | Ding |
| 2013/0149552 A1 | 6/2013 | Yao et al. |
| 2013/0255843 A1 | 10/2013 | Kiuchi et al. |
| 2013/0344344 A1 | 12/2013 | Gastor et al. |
| 2014/0057124 A1 | 2/2014 | Komolwit et al. |
| 2014/0212681 A1 | 7/2014 | Cui et al. |
| 2014/0271318 A1 | 9/2014 | Zheng |
| 2014/0271319 A1 | 9/2014 | Zheng |
| 2014/0272446 A1 | 9/2014 | Zheng |
| 2014/0369741 A1* | 12/2014 | Cui .............. B23K 1/0018 403/271 |
| 2016/0245099 A1 | 8/2016 | Dawson et al. |

FOREIGN PATENT DOCUMENTS

| | | |
|---|---|---|
| CN | 101987385 A | 3/2011 |
| CN | 101994114 A | 3/2011 |
| CN | 102922168 A | 2/2013 |
| CN | 104674157 A | 6/2015 |
| DE | 10016830 A1 | 7/2001 |
| EP | 0152263 | 7/1989 |
| EP | 0673292 | 8/2002 |
| EP | 0673292 B1 | 8/2002 |
| EP | 1881154 A1 | 1/2008 |
| EP | 1881154 | 2/2009 |
| JP | 6077962 | 5/1988 |
| JP | 3070658 | 7/2000 |
| JP | 2011166040 | 8/2011 |
| KR | 20060050963 A | 5/2006 |
| WO | 94/11139 A1 | 5/1994 |
| WO | WO1994011139 A1 | 5/1994 |
| WO | WO2014150311 | 9/2014 |

OTHER PUBLICATIONS

Jan. 22, 2019 Foreign OA K-04253-EP-EPT.
Jul. 11, 2018 International Search Report Transmitted.
Sep. 14, 2016 EPO Notification R64/164.
Nov. 24, 2016 EPO Notification R70a(2)&R70(2).
Nov. 7, 2016 Search Report.
Huang et al., "Wide Gap Braze Repair of Gas Turbine Blades and Vanes", Journal of Engineering for Gas Turbines and Power, Jan. 2012, vol. 134.
Mar. 15, 2018 First Office Action.
Mar. 22, 2018 Office Action.
Mar. 24, 2015 Office Action.
Sulzer, Material Product Data Sheet, Amdry D-15 Diffusion, 2013.

(56) References Cited

OTHER PUBLICATIONS

Special Metals, Incoloy Alloy 825.
Sandmeyer Steel Company, Food Processing.
Sep. 15, 2015 International Preliminary Report on Patentability.
Oct. 21, 2015 Office action (3 months).
K.J. Pallos, Gas Turbine Repair Technology, GE Power Systems.
JJ Conway et al., ASM Manual "Hot Isostatic Pressing of Metal Powders".
Jul. 7, 2015 Office action (3 months).
German, Randall M., Powder Metallurgy and Particulate Materials Processing, 2005, pp. 227-231.
Oct. 28, 2015 EPO Notification R161(1) & R.162.
Jun. 19, 2018 Advisory Action Received.
Apr. 4, 2018 Final Office Action.
Nov. 20, 2017 Office action (3 months).
Jun. 9, 2017 Advisory Action (PTOL-303).
Feb. 13, 2017 Final Office Action.
Aug. 12, 2016 Office action (3 months).
May 20, 2016 Final Office Action.
Jun. 20, 2014 International Search Report and Written Opinion.
Jul. 4, 2014 International Search Report and Written Opinion.
Nov. 6, 2019 Foreign OA.
Apr. 26, 2021 Office Action (non-US) CN App. No. 108620596A.
Apr. 19, 2021 Office Action (non-US) CA App. No. 2892986.
Mar. 4, 2021 EPO Notification Date R.94(3) EP App. No. 2969323.

\* cited by examiner

IMPARTING WEAR RESISTANCE TO SUPERALLOY ARTICLES

FIELD

The present invention relates to compositions for imparting wear resistance to superalloy articles and, in particular, to compositions for metallurgically bonding alloy wear plates or pads to superalloy articles, such as Z-notch contact surfaces of turbine blades.

BACKGROUND

Turbine blades used in gas turbine engines for various industrial, power generation, marine, and transportation applications have a shroud with so-called Z-notches which are configurations in the turbine blade shroud having a "Z" shape. Adjacent blades interlock at the Z-notches. Because these Z-notches are points of contact between adjacent turbine blades, the contact faces of Z-notches experience wear and erosion.

Turbine blades are generally cast from superalloys having high levels of nickel and/or cobalt. Surfacing, resurfacing and repairing components made from nickel-based superalloy and other superalloys by welding techniques present serious technical challenges. For example, high heat input weld overlay processes can disadvantageously impart a heat-affected zone to the substrate and alter material characteristics near the heat-affected zone, often causing the blade to become embrittled in that region. Thermal spray processes require substantial clean-up which is inefficient and can risk substrate damage, and the resulting bond is primarily mechanical and not as good as a true metallurgical bond.

In some applications, contact faces of Z-notches are resurfaced with wear pads or plates. Presently available pads exhibit acceptable wear properties at elevated temperatures. However, these wear pads can slump and/or fall off the bucket if the turbine blades experience temperatures above 1200° C. for time periods exceeding 2 hours during blade manufacture or repair. This problem is acute for buckets requiring repair via hot isostatic pressing and rejuvenation steps at temperatures well above 1200° C. In such cases, the wear pads are removed every time the bucket is repaired leading to increases in cost and turbine downtime.

SUMMARY

In view of these disadvantages, alloy compositions are provided for imparting wear resistance to superalloy articles, including Z-notches of turbine blades. In some embodiments, the alloy compositions exhibit high temperature stability resistant to deformation during superalloy repair and/or rejuvenation processes. In one aspect, composite preforms are provided for imparting wear resistance to superalloy articles. The composite preforms, in some embodiments, can be employed for metallurgically bonding alloy wear plates or pads to superalloy articles, such as Z-notch contact surfaces of turbine blades. A composite preform, in some embodiments, comprises a powder alloy composition comprising 1-30 wt. % nickel, 0.05-2 wt. % iron, 15-25 wt. % chromium, 10-30 wt. % molybdenum, 0-1 wt. % carbon, 1-5 wt. % silicon, 0.05-2 wt. % boron, 0-5 wt. % tungsten, 0-3 wt. % tantalum, 0-0.1 wt. % manganese, 0-3 wt. % aluminum, 0-0.1 wt. % yttrium and the balance cobalt. The powder alloy compositions described herein can be associated with an organic carrier in some embodiments for application to one or more surfaces of a superalloy article.

In some embodiments, a composite preform comprises a powder alloy composition comprising 25-35 wt. % cobalt, 0.1-1 wt. % iron, 12-20 wt. % chromium, 10-20 wt. % molybdenum, 0-0.1 wt. % carbon, 0.5-3 wt. % silicon, 0.5-3 wt. % boron, 0-0.1 wt. % manganese, 0-0.1 wt. % tungsten, 0-2 wt. % tantalum, 0.5-3 wt. % aluminum, 0-0.1 wt. % yttrium and the balance nickel.

In another aspect, methods of imparting wear resistance to nickel-based superalloy articles are provided. In some embodiments, a method comprises providing a composite preform comprising a powder alloy composition of 1-30 wt. % nickel, 0.05-2 wt. % iron, 15-25 wt. % chromium, 10-30 wt. % molybdenum, 0-1 wt. % carbon, 1-5 wt. % silicon, 0.05-2 wt. % boron, 0-5 wt. % tungsten, 0-3 wt. % tantalum, 0-0.1 wt. % manganese, 0-3 wt. % aluminum, 0-0.1 wt. % yttrium and the balance cobalt and providing a wear plate or pad of cobalt-based alloy. The composite preform is positioned between the wear plate and surface of the nickel-based superalloy article to form an assembly. The assembly is heated to metallurgically bond the wear plate to the surface of the nickel-based superalloy article via a bonding alloy formed by the powder alloy composition. In some embodiments, the composite preform for bonding the wear plate comprises 25-35 wt. % cobalt, 0.1-1 wt. % iron, 12-20 wt. % chromium, 10-20 wt. % molybdenum, 0-0.1 wt. % carbon, 0.5-3 wt. % silicon, 0.5-3 wt. % boron, 0-0.1 wt. % manganese, 0-0.1 wt. % tungsten, 0-2 wt. % tantalum, 0.5-3 wt. % aluminum, 0-0.1 wt. % yttrium and the balance nickel.

These and other non-limiting embodiments are further described in the following detailed description.

DETAILED DESCRIPTION

Embodiments described herein can be understood more readily by reference to the following detailed description and examples and their previous and following descriptions. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Composite Preforms

In one aspect, composite preforms are provided for imparting wear resistance to superalloy articles. The composite preforms can be employed for metallurgically bonding alloy wear plates or pads to superalloy articles. A composite preform can comprise a powder alloy composition comprising 1-30 wt. % nickel, 0.05-2 wt. % iron, 15-25 wt. % chromium, 10-30 wt. % molybdenum, 0-1 wt. % carbon, 1-5 wt. % silicon, 0.05-2 wt. % boron, 0-5 wt. % tungsten, 0-3 wt. % tantalum, 0-0.1 wt. % manganese, 0-3 wt. % aluminum, 0-0.1 wt. % yttrium and the balance cobalt. In some embodiments, cobalt-based powder alloy of a composite preform has composition selected from Table I.

TABLE I

Powder Alloy of Composite Preform

| Alloy Powder | Co wt. % | Ni wt. % | Fe wt. % | Cr wt. % | Mo wt. % | C wt. % | Si wt. % | B wt. % | W wt. % | Ta wt. % | Mn wt. % |
|---|---|---|---|---|---|---|---|---|---|---|---|
| 1 | Bal. | 4.5-7 | 0.3-0.9 | 20-24 | 12-18 | 0.1-1 | 1-2.2 | 0.9-2 | 2.5-5 | 1-2 | 0-0.1 |
| 2 | Bal. | 3-5 | 0.7-1.1 | 18-22 | 16-20 | 0.1-0.5 | 1.9-2.5 | 0.7-1 | 1-3 | 1-1.5 | 0-0.1 |
| 3 | Bal. | 2.5-4 | 0.7-1.2 | 17-21 | 18-22 | 0.1-0.3 | 2-3 | 0.4-0.8 | 0.8-2.5 | 0.5-1 | 0-0.1 |
| 4 | Bal. | 2-4 | 0.8-1.3 | 17-21 | 20-24 | 0.1-0.3 | 2.5-3 | 0.3-0.7 | 0.7-2 | 0.5-1 | 0-0.1 |
| 5 | Bal. | 1.5-3 | 1-2 | 16-20 | 23-28 | 0.05-2 | 2.8-4 | 0.1-0.5 | 0.3-1 | 0.1-0.5 | 0-0.1 |
| 6 | Bal. | 1-10 | 0.1-1.5 | 16-22 | 12-28 | 0-0.5 | 1-4 | 0.1-2 | 0.5-5 | 0-3 | 0-0.1 |
| 7 | Bal. | 4-7 | 0.2-0.6 | 18-22 | 12-16 | 0-0.5 | 1-2 | 1-2 | 2.5-5 | 1.5-2.5 | 0-0.1 |
| 8 | Bal. | 3.5-5 | 0.3-0.7 | 17-21 | 16-20 | 0-0.3 | 1.5-2.5 | 0.8-1.5 | 2-3 | 1-1.5 | 0-0.1 |
| 9 | Bal. | 2.5-4 | 0.4-0.8 | 16-20 | 19-24 | 0-0.2 | 1.5-2.5 | 0.5-0.9 | 1.5-2.5 | 0.5-1 | 0-0.1 |
| 10 | Bal. | 2-3 | 0.5-1 | 16-20 | 20-25 | 0-0.2 | 2-3 | 0.4-0.8 | 1-2 | 0.5-1 | 0-0.1 |
| 11 | Bal. | 1-2 | 0.6-1.2 | 16-20 | 22-28 | 0-0.1 | 2.5-3.5 | 0.1-0.5 | 0.5-1 | 0.1-0.5 | 0-0.1 |

In some embodiments, powder alloy of a composite preform has a composition selected from Table II.

TABLE II

Powder Alloy of Composite Preform

| Alloy Powder | Co wt. % | Ni wt. % | Fe wt. % | Cr wt. % | Mo wt. % | C wt. % | Si wt. % | B wt. % | W wt. % | Ta wt. % | Mn wt. % | Al wt. % | Y wt. % |
|---|---|---|---|---|---|---|---|---|---|---|---|---|---|
| 12 | Bal. | 5-30 | 0.1-2 | 14-20 | 12-30 | 0-0.1 | 1-4 | 0.1-2 | 0-0.1 | 0-2 | 0-0.1 | 0.1-3 | 0-0.1 |
| 13 | Bal. | 20-30 | 0.7-1.5 | 15-20 | 16-22 | 0-0.1 | 1.5-2.5 | 0.7-1 | 0-0.1 | 0.1-1.5 | 0-0.1 | 0.8-1.5 | 0-0.1 |
| 14 | Bal. | 16-22 | 0.8-1.3 | 16-20 | 18-25 | 0-0.1 | 2-3 | 0.5-0.8 | 0-0.1 | 0.1-1 | 0-0.1 | 0.7-1.3 | 0-0.1 |
| 15 | Bal. | 12-16 | 1-1.5 | 16-20 | 19-26 | 0-0.1 | 2.5-3 | 0.3-0.7 | 0-0.1 | 0.1-0.7 | 0-0.1 | 0.5-1 | 0-0.1 |
| 16 | Bal. | 5-12 | 1.2-1.5 | 16-20 | 20-30 | 0-0.1 | 2.5-3.5 | 0.1-0.5 | 0-0.1 | 0.1-0.5 | 0-0.1 | 0.1-0.5 | 0-0.1 |
| 17 | Bal. | 20-26 | 0.4-1 | 13-17 | 16-20 | 0-0.1 | 1.5-2.5 | 0.8-1.3 | 0-0.1 | 0.7-1.2 | 0-0.1 | 1-1.5 | 0-0.1 |
| 18 | Bal. | 15-20 | 0.5-1 | 14-18 | 18-24 | 0-0.1 | 2-3 | 0.5-1 3 | 0-0.1 | 0.5-1 | 0-0.1 | 0.6-1.2 | 0-0.1 |
| 19 | Bal. | 12-16 | 0.5-1 | 14-18 | 21-25 | 0-0.1 | 2-3 | 0.5-1 | 0-0.1 | 0.3-0.7 | 0-0.1 | 0.5-1 | 0-0.1 |
| 20 | Bal. | 5-10 | 0.5-1 | 14-18 | 22-28 | 0-0.1 | 2.5-3.5 | 0.1-0.6 | 0-0.1 | 0.05-0.5 | 0-0.1 | 0.05-0.5 | 0-0.1 |

Alternatively, a composite preform can comprise a powder alloy composition comprising 25-35 wt. % cobalt, 0.1-1 wt. % iron, 12-20 wt. % chromium, 10-20 wt. % molybdenum, 0-0.1 wt. % carbon, 0.5-3 wt. % silicon, 0.5-3 wt. % boron, 0-0.1 wt. % manganese, 0-0.1 wt. % tungsten, 0-2 wt. % tantalum, 0.5-3 wt. % aluminum, 0-0.1 wt. % yttrium and the balance nickel. In some embodiments, powder alloy of a composite preform has a composition selected from Table III.

TABLE III

Powder Alloy of Composite Preform

| Alloy Powder | Ni wt. % | Co wt. % | Fe wt. % | Cr wt. % | Mo wt. % | C wt. % | Si wt. % | B wt. % | W wt. % | Ta wt. % | Mn wt. % | Al wt. % | Y wt. % |
|---|---|---|---|---|---|---|---|---|---|---|---|---|---|
| 21 | Bal. | 25-32 | 0.5-1 | 14-20 | 12-18 | 0-0.1 | 1-2 | 1-1.5 | 0-0.1 | 0.5-2 | 0-0.1 | 1-3 | 0-0.1 |
| 22 | Bal. | 25-35 | 0.1-0.5 | 13-17 | 12-16 | 0-0.1 | 1-2 | 1-2 | 0-0.1 | 0.5-2 | 0-0.1 | 1-3 | 0-0.1 |

Powder alloy compositions of composite preforms described herein, in some embodiment, are provided as a single, pre-alloyed powder. In other embodiments, powder alloy compositions can be formed of a mixture of two or more powder components. Two or more powder components can be combined or blended to form a powder alloy composition having any of the parameters described herein. For example, two or more powder components can be mixed to provide a powder alloy composition having parameters selected from Tables I-III herein. In some embodiments, a cobalt powder alloy component and a cobalt braze powder alloy component are combined or mixed in various proportions to provide a powder alloy composition of a composite preform. In some embodiments, the cobalt powder alloy component is a CoCrMoSi alloy or CoCrMoSiB alloy. In particular, the cobalt powder alloy component can have a composition selected from Table IV in some embodiments.

TABLE IV

Cobalt Powder Alloy Component

| Alloy | Co wt. % | Cr wt. % | Mo wt. % | Si wt. % | B wt. % |
|---|---|---|---|---|---|
| CoCrMoSi | Bal. | 5-20 | 22-32 | 1-4 | — |
| CoCrMoSiB | Bal. | 5-20 | 22-32 | 1-4 | 0.05-0.5 |

Moreover, the cobalt braze powder alloy component, in some embodiments, has a composition provided in Table V.

TABLE V

Cobalt Braze Alloy Component

| Co wt. % | Cr wt. % | Ni wt. % | W wt. % | Ta wt. % | B wt. % | C wt. % |
|---|---|---|---|---|---|---|
| Bal. | 20-29 | 5-15 | 3-10 | 0-5 | 1-4 | 0-1 |

Cobalt powder alloy of Table IV and cobalt braze alloy of Table V can be mixed in various proportions to provide powder alloy compositions of composite preforms having parameters selected from Tables I and II herein. In some embodiments, for example, cobalt powder alloy component selected from Table IV is present in an amount of 10-90 weight percent of the powder alloy composition. Additionally, cobalt braze alloy component of Table V can be present in an amount of 30-70 weight percent of the powder alloy composition. In some embodiments, the ratio of cobalt alloy to cobalt braze alloy in a powder alloy composition ranges from 9:1 to 1:3 or from 9:1 to 1:1.

In some embodiments, the cobalt braze alloy component can be replaced by a nickel braze alloy component in preparation of a powder alloy composition of a composite preform. For example, a nickel braze powder alloy can be combined with cobalt powder alloy to provide a powder alloy composition of a composite preform having a composition selected from Table III herein. In some embodiments, a nickel braze alloy for combination with cobalt powder alloy has a composition provided in Table VI.

TABLE VI

Nickel Braze Alloy Component

| Ni wt. % | Co wt. % | Cr wt. % | B wt. % | Ta wt. % | Al wt. % | Y wt. % |
|---|---|---|---|---|---|---|
| Bal. | 5-15 | 10-20 | 1-4 | 0-5 | 0-5 | 0-0.1 |
| Bal. | 7-12 | 10-15 | 2-3 | 2-3 | 2.5-5 | 0-0.1 |

In some embodiments, nickel braze alloy is present in an amount of 30-70 weight percent of the powder alloy composition. The ratio of cobalt alloy to nickel braze alloy in a powder alloy composition can range from 9:1 to 1:3 or from 9:1 to 1:1.

Cobalt powder alloy, cobalt braze alloy and/or nickel braze alloy of the composite preform can have any desired particle size. Particle size can be selected according to various criteria including dispersability in an organic carrier and packing characteristics to provide composite preforms of desired density. In some embodiments, average particle size of one or more components of a powder alloy composition can range from 10 µm to 150 µm or from 40 µm to 125 µm.

The powder alloy composition can be associated with an organic carrier in some embodiments for application to one or more surfaces of a superalloy article. Any organic carrier not inconsistent with the objectives of the present invention can be employed. In some embodiment suitable organic carrier for the powder alloy composition comprises a fibrous polymeric matrix. As detailed further in the examples below, the fibrous polymeric matrix can form a flexible cloth in which the powder alloy composition is dispersed. The flexible polymeric cloth can have any thickness not inconsistent with the objectives of the present invention. For example, the flexible polymeric cloth can generally have a thickness of 0.2-4 mm or 1-2 mm. Any polymeric species operable to adopt a fiber or filament morphology can be used in matrix construction. Suitable polymeric species can include fluoropolymers, polyamides, polyesters, polyolefins or mixtures thereof. In some embodiments, for example, the fibrous polymeric matrix is formed of fibrillated polytetrafluoroethylene (PTFE). In such embodiments, the PTFE fibers or fibrils can provide an interconnecting network matrix in which the powder alloy composition is dispersed and trapped. Moreover, fibrillated PTFE can be combined with other polymeric fibers, such as polyamides and polyesters to modify or tailor properties of the fibrous matrix. The fibrous polymeric matrix generally accounts for less than 1.5 weight percent of the composite preform. In some embodiments, for example, the fibrous polymeric matrix accounts for 1.0-1.5 weight percent or 0.5-1.0 weight percent of the composite preform.

The composite preform can be fabricated by various techniques to disperse the powder alloy composition in the fibrous polymeric matrix. In some embodiments, the composite preform is fabricated by combining polymeric powder, cobalt alloy powder, cobalt braze alloy powder and/or nickel braze alloy powder and mechanically working the mixture to fibrillate the polymeric powder and trap the alloy powders in the resulting fibrous polymeric matrix. In a specific embodiment, for example, components of the powder alloy composition are mixed with 3-15 vol. % of PTFE powder and mechanically worked to fibrillate the PTFE and trap the powder alloy composition in a fibrous PTFE matrix. As described herein, components of the powder alloy composition can be selected from Tables IV-VI above. Mechanical working of the powder mixture can include ball milling, rolling, stretching, elongating, extruding, spreading or combinations thereof. In some embodiments, the resulting PTFE-flexible composite preform cloth is subjected to cold isostatic pressing. A composite preform described herein can be produced in accordance with the disclosure of one or more of U.S. Pat. Nos. 3,743,556, 3,864,124, 3,916,506, 4,194,040 and 5,352,526, each of which is incorporated herein by reference in its entirety.

As detailed in the examples below, a composite preform formed by a polymeric carrier having the powder alloy composition positioned therein, in some embodiments, can exhibit green density of at least 50 percent the density of a wear pad bonded to the superalloy article. In some embodiments, green density of a composite preform can be at least 60 percent or at least 65 percent the density of the wear pad. Green density of the composite preform can also be 50-75 percent or 60-70 percent of wear pad density. High green density of the composite preform can assist in forming a strong metallurgical bond between the wear pad and superalloy article. High green density can also assist in reducing or eliminating porosity in the bonding alloy formed by heating the composite preform according to methods described herein.

Alternatively, the powder alloy composition can be associated with a liquid carrier for application to one or more surfaces of a superalloy article. Aqueous and/or organic liquid carriers may be employed depending on specific powder alloy composition and properties.

II. Methods of Imparting Wear Resistance to Superalloy Articles

In another aspect, methods of imparting wear resistance to a nickel-based superalloy article are provided. In some embodiments, a method comprises providing a composite preform comprising a powder alloy composition 1-30 wt. % nickel, 0.05-2 wt. % iron, 15-25 wt. % chromium, 10-30 wt. % molybdenum, 0-1 wt. % carbon, 1-5 wt. % silicon, 0.05-2 wt. % boron, 0-5 wt. % tungsten, 0-3 wt. % tantalum, 0-0.1 wt % manganese, 0-3 wt. % aluminum, 0-0.1 wt % yttrium and the balance cobalt and providing a wear plate or pad of cobalt-based alloy. The composite preform is positioned between the wear plate and surface of the nickel-based alloy article to form an assembly. The assembly is heated to metallurgically bond the wear plate to the surface of the nickel-based superalloy article via a bonding alloy formed by the powder alloy composition. In some embodiments, the powder alloy composition of the composite preform has parameters selected from Tables I and II herein. Alternatively, the powder alloy composition of the composite preform can comprise 25-35 wt. % cobalt, 0.1-1 wt. % iron, 12-20 wt. % chromium, 10-20 wt. % molybdenum, 0-0.1 wt. % carbon, 0.5-3 wt. % silicon, 0.5-3 wt. % boron, 0-0.1 wt % manganese, 0-0.1 wt. % tungsten, 0-2 wt. % tantalum, 0.5-3 wt. % aluminum, 0-0.1 wt. % yttrium and the balance nickel. For example, the powder alloy composition can have parameters selected from Table III herein.

Composite preforms can have any properties and construction described in Section I above. In some embodiments, the composite preform comprises a polymeric carrier for the powder alloy composition. The flexible, cloth like nature of the polymeric matrix can facilitate application of the composite preform to surfaces of varying geometry and/or curvature of the nickel-based superalloy article. Moreover, the composite preforms can exhibit high green densities described above. Composite preforms can be used to bond one or more wear pads to any contact or wear surface of the nickel-based superalloy article. Wear surface design and geometry can be derived by the function of the nickel-based superalloy article. In some embodiments, the nickel-based superalloy article can comprise turbine blades wherein wear pads are bonded to contact surfaces of the Z-notches. In some embodiments, a single composite preform is applied between the wear plate and surface of the nickel-based superalloy article. Alternatively, multiple composite preforms can be applied between the wear pad and surface of the nickel-based superalloy part. For example, composite preforms can be applied in a layered format between the wear pad and superalloy surface. Layering the composite preforms can enable production of bonding alloy of any desired thickness. The surface of the nickel-based superalloy article may be cleaned by chemical and/or mechanical means prior to composite preform application, such as by fluoride ion cleaning.

An assembly is formed by application of one or more composite preforms between the wear pad and surface of the nickel-based superalloy article. The assembly is heated to metallurgically bond the wear plate to the surface of the nickel-based superalloy article via a bonding alloy formed by the powder alloy composition. Heating the assembly decomposes the polymeric fibrous matrix, and the bonding alloy is formed from the powder alloy composition of the composite preform. As described herein, the powder alloy composition can be formed of multiple powder components including cobalt powder alloy in combination with cobalt braze alloy or nickel braze alloy. The assembly is generally heated to a temperature in excess of the melting point of the cobalt braze powder alloy component or nickel braze powder alloy component and below the melting point of the cobalt powder alloy component. Molten flow characteristics of the cobalt braze alloy or nickel braze alloy can permit formation of a void-free or substantially void-free interface between the wear plate and the nickel-based superalloy article. Heating temperature and heating time period are dependent on the specific compositional parameters of the nickel-based superalloy part and composite preform. In some embodiments, for example, the assembly is heated under vacuum to a temperature of 1200-1230° C. for a time period of 5-30 minutes. In some embodiments, heating is continued at 1100-1150° C. for 1 to 4 hours.

Cobalt-based alloy of the wear plate can have any composition not inconsistent with the objectives of the present invention. In some embodiments, the cobalt-based alloy forming the wear plate is a CoCrMoSi alloy. Cobalt-based alloy of the wear pad, for example, can have composition selected from Table VII.

TABLE VII

Cobalt Alloy of Wear Pad

| Alloy | Co wt. % | Ni wt. % | Fe wt. % | Cr wt. % | Mo wt. % | C wt. % | Si wt. % | B wt. % |
|---|---|---|---|---|---|---|---|---|
| 1 | Bal. | 0-3 | 0-3 | 14-22 | 25-35 | 0-0.1 | 1-5 | 0-0.5 |
| 2 | Bal. | 0.5-2 | 0.5-2 | 14-20 | 25-30 | 0-0.1 | 2-4 | 0-0.5 |
| 3 | Bal. | 0.5-1 | 0.5-1 | 14-18 | 26-30 | 0-0.1 | 2-4 | 0.1-0.3 |

In some embodiments, cobalt-based alloy of the wear pad has a composition selected from Table VIII.

TABLE VIII

Cobalt Alloy of Wear Pad

| Alloy | Co wt. % | Fe wt. % | Cr wt. % | W wt. % | C wt. % | Mn wt. % | Si wt. % |
|---|---|---|---|---|---|---|---|
| 1 | Bal. | 0-2.5 | 25-35 | 16-24 | 0-1 | 0-1 | 0-1 |
| 2 | Bal. | 0-2.5 | 27-31 | 18-20 | 0-1 | 0-1 | 0-1 |

In some embodiments, the wear pad is formed of cobalt-based alloy operable to withstand deformation at temperatures in excess of 1200° C. or 1220° C. The cobalt-based alloy wear pad, for example, can withstand deformation or softening at temperatures in excess of 1200° C. or 1220° C. for time periods exceeding 2 hours or more. High temperature stability of the wear pad can enable the wear pad to avoid degradation during turbine blade repair processes including hot isostatic pressing and rejuvenation steps at temperatures in excess of 1200° C. while maintaining strong metallurgical bonding with the nickel-based superalloy article.

In a further aspect, composite preforms of Section I herein can be applied to surfaces of the wear pad after the wear pad has been metallurgically bonded to the nickel-based superalloy article. The composite preform is subsequently heated to form an alloy wear layer on the wear pad. In this way, the wear properties of the wear pad can be enhanced and/or restored. For example, the wear pad may become worn after use of the nickel-based superalloy article in its operating environment. The wear pad may be restored by application of one or more composite preforms herein followed by heating to form an alloy wear layer. The alloy wear layer may replace material of the wear pad that was lost or degraded during use of the nickel-based superalloy article. Composite preforms of any composition and/or properties can be applied to surfaces of cobalt-based alloy wear pads for restoration and/or enhancement of wear properties.

As described herein, the powder alloy composition can be formed of separate powder components including a combination or mixture of cobalt powder alloy with cobalt braze alloy or nickel braze alloy. In some embodiments, individual components of the powder alloy composition can be associated with separate carriers. For example, cobalt powder alloy can be positioned in a first organic carrier, and the cobalt braze powder alloy or nickel braze powder alloy can be positioned in a second organic carrier. In some embodiments, the first organic carrier is a first polymeric sheet, and the second organic carrier is a second polymeric sheet. The first and second sheets are layered to provide the composite preform. The layered composite preform is positioned between the wear pad and surface of the nickel-based superalloy part to form the assembly. The assembly is heated to metallurgically bond the wear plate to the surface of the nickel-based superalloy article via a bonding alloy formed by the powder alloy composition.

In further aspects, the powder alloy composition can be provided in a liquid carrier for application to one or more surfaces of the nickel-based superalloy. In some embodiments, all components of the powder alloy composition are in a single liquid carrier. For example, the cobalt alloy powder component can be added to a liquid carrier with the cobalt braze powder component or nickel braze powder component. In other embodiments, individual powder components of the powder alloy composition can be added to separate liquid carriers and applied to one or more surfaces of the nickel-based superalloy.

These and other embodiments are further illustrated in the following non-limiting examples.

Example 1—Z-Notch Hardfacing

Cobalt-based alloy wear pads were provided and metallurgically bonded to contact surfaces of Z-notches of turbine blades as follows. The Z-notch contact surfaces and associated turbine blades were formed of nickel-based superalloy of composition substantially similar to Rene 80. Composite preforms were formed by providing a powder alloy of Composition 2 selected from Table I above. The powder alloy composition was a mixture of 65 weight percent cobalt powder alloy and 35 weight percent cobalt braze powder alloy. The cobalt powder alloy was a CoCrMoSi alloy having nominal composition of 0.5-2 wt. % iron, 16-19 wt. % chromium, 28-30 wt % molybdenum, 0.01-0.1 wt % carbon, 3-4 wt. % silicon, 0-0.2 wt. % boron, 0-0.1 wt % manganese and the balance Co. The cobalt braze powder alloy had nominal composition of 9-11 wt. % nickel, 24-26 wt. % chromium, 0.5-1 wt % carbon, 2-3 wt. % boron, 6-8 wt. % tungsten, 3-4 wt % tantalum and the balance cobalt. The powder alloy composition was mixed with 5-15 vol. % of powder PTFE. The mixture was mechanically worked to fibrillate the PTFE and trap powder alloy composition and then rolled, thus forming the composite preform as a cloth-like flexible sheet of thickness 1-2 mm.

Figure 1:
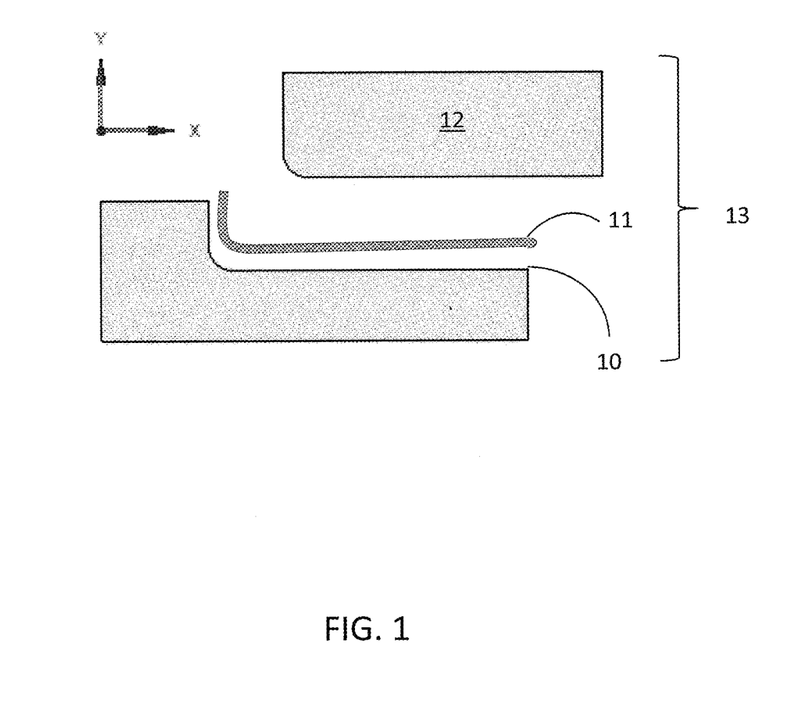
FIG. 1 is a schematic illustrating arrangement of a composite preform between a Z-notch contact surface and alloy wear pad according to some embodiments.

A composite preform 11 was positioned between each Z-notch contact surface 10 and the wear pad 12 as illustrated in FIG. 1 to form an assembly 13. Wear pads employed in this example were formed of cobalt-based alloy having nominal composition of 1-2 wt % nickel, 1-2 wt % iron, 17-19 wt % chromium, 27-29 wt % molybdenum, 0-0.1 wt % carbon, 3-4 wt % silicon and the balance cobalt. The composite preform exhibited green density of 68-69% the density of the cobalt alloy wear pads.

Figure 2:
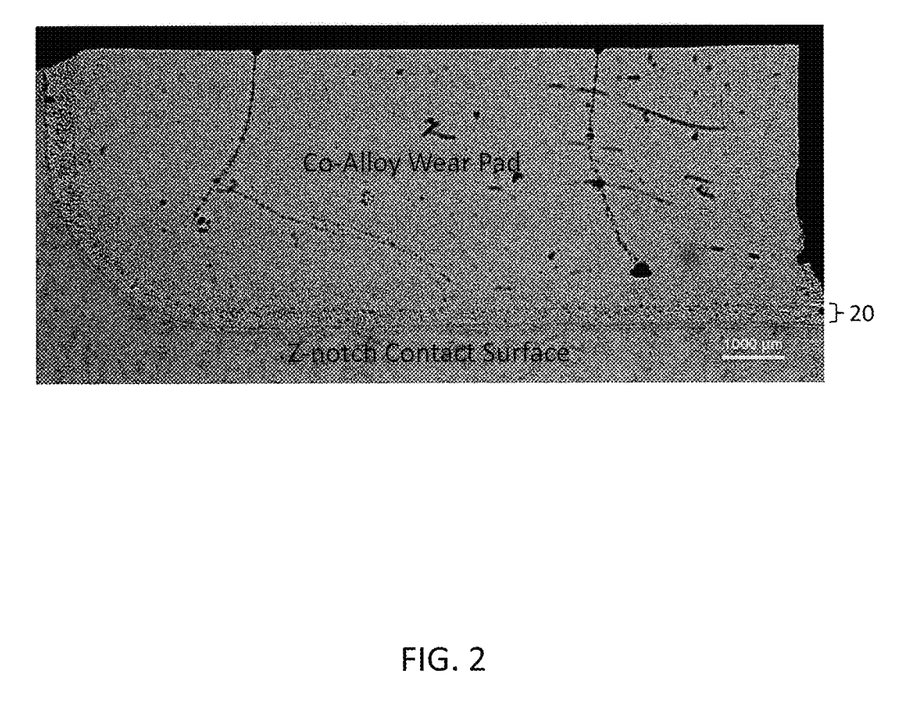
FIG. 2 is cross-sectional optical microscopy of a cobalt alloy wear pad metallurgically bonded to a Z-notch contact surface according to Example 1 herein.

The assemblies were heated under vacuum at 1200-1220° C. for 5-20 minutes followed by a hold at 1100-1150° C. for 1-3 hours. The heat treatment metallurgically bonded the cobalt alloy wear pads to the Z-notch contact surfaces via bonding alloy formed by the powder alloy composition. FIG. 2 is cross-sectional optical microscopy of one cobalt alloy wear pad metallurgically bonded to a Z-notch contact surface. As illustrated in FIG. 2, the bonding region 20 exhibited porosity less than 5 vol. %.

Figure 3:
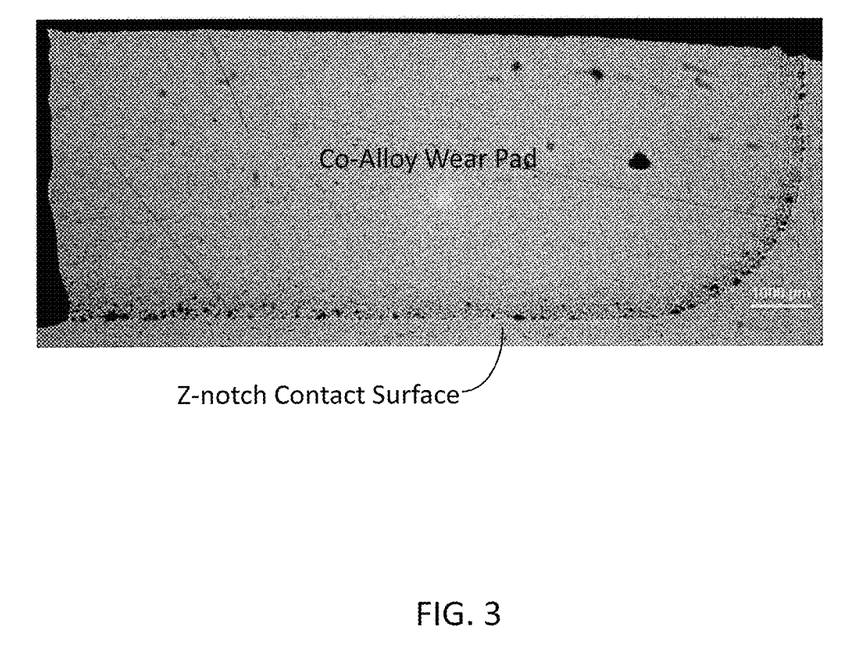
FIG. 3 is cross-sectional optical microscopy of the cobalt alloy wear pad and Z-notch surface subsequent to the ageing and rejuvenation according to Example 1 herein.

The wear pads and associated Z-notch contact surfaces were subjected to superalloy ageing and rejuvenation at 1200-1210° C. for a time period of 4 hours. FIG. 3 is cross-sectional optical microscopy of one cobalt alloy wear pad and Z-notch surface subsequent to the ageing and rejuvenation. Strong metallurgical bonding remains between the wear pad and the Z-notch contact face. Moreover, the cobalt alloy wear pad did not exhibit any deformation, slumping or softening from the ageing and rejuvenation process.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A composite preform comprising:
   a powder alloy composition comprising a mixture of a CoMoCrSi powder alloy, and a cobalt braze powder alloy having a lower melting temperature than the CoMoCrSi powder alloy, wherein the CoMoCrSi powder alloy comprises 5-20 wt. % chromium, 22-32 wt. % molybdenum, 1-4 wt. % silicon and the balance cobalt, and the cobalt braze powder alloy comprises 20-29 wt. % chromium, 5-15 wt. % nickel, 3-10 wt. % tungsten, 0-5 wt. % tantalum, 1-4 wt. % boron, 0-1 wt. % carbon and the balance cobalt, wherein the CoMoCrSi powder alloy is present in an amount of 10-90 weight percent of the powder alloy composition.

2. The composite preform of claim 1 further comprising an organic binder or organic carrier for the powder alloy composition.

3. The composite preform of claim 2, wherein the powder alloy composition is dispersed in an organic carrier comprising a fibrous polymer matrix.

4. The composite preform of claim 1, wherein the cobalt braze powder alloy component is present in an amount of 30-70 weight percent of the powder alloy composition.

5. The composite preform of claim 1, wherein the ratio of CoMoCrSi powder alloy to cobalt braze powder alloy in the mixture ranges from 9:1 to 1:3.

6. The composite preform of claim 1, wherein the ratio of CoMoCrSi powder alloy to cobalt braze powder alloy in the mixture ranges from 9:1 to 1:1.

* * * * *